W. H. FULTON.
Stump-Extractor
No. 161,500. Patented March 30, 1875.
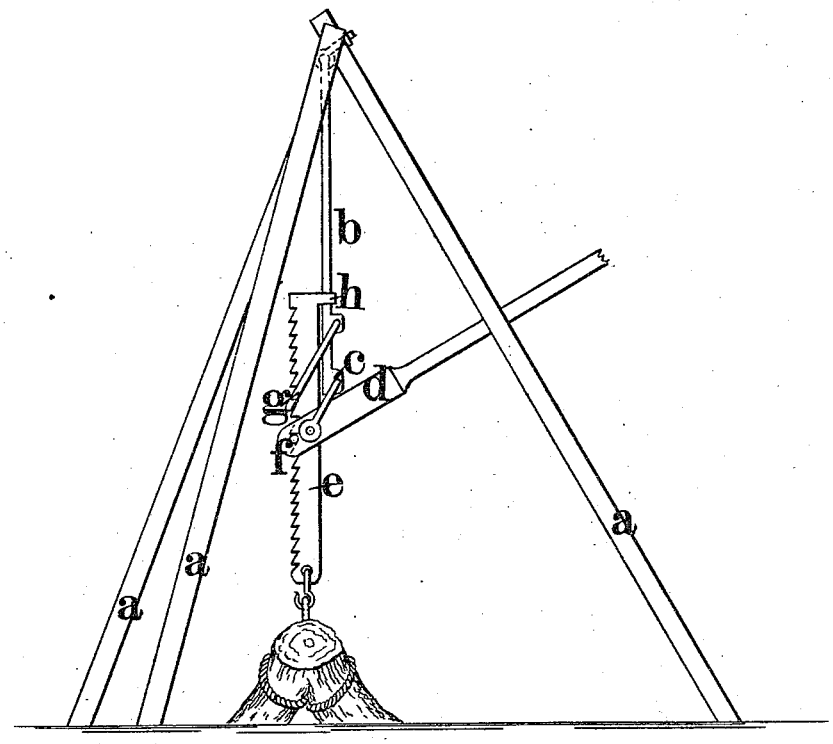
Witnesses.
Inventor.
Per Atty.

UNITED STATES PATENT OFFICE.

WILLIAM H. FULTON, OF FOXCROFT, MAINE.

IMPROVEMENT IN STUMP-EXTRACTORS.

Specification forming part of Letters Patent No. 161,500, dated March 30, 1875; application filed October 30, 1874.

*To all whom it may concern:*

Be it known that I, WM. H. FULTON, of Foxcroft, in the county of Piscataquis and State of Maine, have invented certain new and useful Improvements in Stump-Extractors; and I do hereby declare that the following is a full, clear, and exact description thereof, that will enable others skilled in the art to which it appertains to make and use the same, reference being had to the accompanying drawings, forming a part of this specification, in which is shown a side elevation of my invention:

My invention consists of a modification of the stump-extractor, for which I made application for a patent September 18, 1874. The frame and rod suspending the lever and rack-bar are retained, but certain alterations are made in the attachment of the lever to the rod, in the holding devices, and in the rack-bar itself, which enables the machine to be more economically constructed, requiring less iron-work, and thus reducing its weight as well as cost.

Referring to the drawing, $a$ shows a suitable frame to which is attached the suspending-rod $b$. To the lower end of this rod is jointed the fulcrum-yoke $c$, supporting the lever $d$. This lever is forked, and incloses between its sides the rack-bar $e$, provided with teeth upon one side. This bar is raised by means of a pin, $f$, passing from side to side of the lever $d$ and engaging the teeth. The stump or rock to be lifted is attached to the lower end of the rack-bar, as shown, and by working the lever $d$ said bar is gradually raised. As it rises it is retained in place by means of a link, $g$, attached to the suspension-rod, and inclosing the rack-bar, crossing it diagonally, as shown. This link is caused by the action of gravitation to mesh into the teeth of the rack, holding it as it rises. An eye, $h$, upon the upper end of the rack-bar, and inclosing the suspending-rod, (as in said former application,) serves to guide the bar in its vertical movement.

What I claim as my invention, and desire to secure by Letters Patent, is—

In combination with the frame $a$, suspending-rod $b$, jointed fulcrum-yoke $c$, and lever $d$, the rack-bar $e$, and link $f$ jointed to said suspending-rod, all arranged and operating substantially as herein shown and described.

In testimony that I claim the foregoing, I have hereunto set my hand this 27th day of October, 1874.

WILLIAM HOWARD FULTON.

Witnesses:
 WM. FRANKLIN SEAVEY,
 W. E. BROWN.